(12) United States Patent
Vrzic et al.

(10) Patent No.: US 9,084,205 B2
(45) Date of Patent: Jul. 14, 2015

(54) UPLINK POWER CONTROL SCHEME FOR A WIRELESS COMMUNICATION SYSTEM

(75) Inventors: Sophie Vrzic, Nepean (CA); Mo-Han Fong, Ottawa (CA)

(73) Assignee: RPX Clearinghouse LLC, San Francisco, CA (US)

(*) Notice: Subject to any disclaimer, the term of this patent is extended or adjusted under 35 U.S.C. 154(b) by 1443 days.

(21) Appl. No.: 12/741,774

(22) PCT Filed: Nov. 7, 2008

(86) PCT No.: PCT/IB2008/003008
§ 371 (c)(1),
(2), (4) Date: Oct. 10, 2011

(87) PCT Pub. No.: WO2009/060303
PCT Pub. Date: May 14, 2009

(65) Prior Publication Data
US 2012/0064936 A1    Mar. 15, 2012

Related U.S. Application Data

(60) Provisional application No. 60/986,779, filed on Nov. 9, 2007.

(51) Int. Cl.
*H04W 52/30*    (2009.01)
*H04W 52/24*    (2009.01)
(Continued)

(52) U.S. Cl.
CPC .......... *H04W 52/243* (2013.01); *H04W 52/146* (2013.01); *H04W 52/367* (2013.01); *H04W 52/365* (2013.01)

(58) Field of Classification Search
CPC ..... H04W 52/00; H04W 52/18; H04W 52/24; H04W 52/241; H04W 52/243; H04W 52/244; H04W 52/245; H04W 52/246; H04W 52/247; H04W 52/248; H04W 52/34; H04W 52/343; H04W 52/346; H04W 52/06; H04W 52/08; H04W 52/10; H04W 52/12
USPC ........................................... 455/522
See application file for complete search history.

(56) References Cited

U.S. PATENT DOCUMENTS

2005/0130690 A1    6/2005  Shinozaki
2006/0234752 A1*   10/2006 Mese et al. ............... 455/522
(Continued)

FOREIGN PATENT DOCUMENTS

EP         1434364 A2      6/2004
WO     2004032373 A1      4/2004
(Continued)

OTHER PUBLICATIONS

Author Unknown, "3GPP TSG-RAN WG1#50bis," Shanghai, China, Oct. 8, 2007, 2 pages.
(Continued)

*Primary Examiner* — Philip Sobutka
(74) *Attorney, Agent, or Firm* — Withrow & Terranova, PLLC

(57) ABSTRACT

An uplink power control scheme for a wireless communication system is provided. In general, a subscribing station is located within a serving sector of a cell served by a base station in a wireless communication network. In one embodiment, the subscribing station obtains interference parameters for one or more neighboring sectors of the serving sector of the subscribing station. In this embodiment, the interference parameters are interference thresholds. The subscribing station then controls a maximum transmit power, and thus a power headroom, of the subscribing station based on the interference thresholds for the one or more neighboring sectors.

20 Claims, 9 Drawing Sheets

(51) Int. Cl.
*H04W 52/36* (2009.01)
*H04W 52/14* (2009.01)

(56) References Cited

U.S. PATENT DOCUMENTS

2007/0195734 A1    8/2007  Das et al.
2008/0062925 A1*   3/2008  Mate et al. .................... 370/331
2009/0062925 A1*   3/2009  Samuelson ................ 623/23.12

FOREIGN PATENT DOCUMENTS

WO    2006099546  A1    9/2006
WO    2007101510  A1    9/2007
WO    2007/119133 A2    10/2007

OTHER PUBLICATIONS

Office Action for Chinese patent application 200880124697.6 mailed Jan. 11, 2013, 17 pages.
Chinese Office Action for Chinese Application No. 200880124697.6, mailed Oct. 22, 2013, 10 pages.
Decision to Grant a Patent for Japanese Patent Application No. 2010-532671, mailed Jun. 18, 2013, 5 pages.
International Search Report for International Patent Appl. No. PCT/IB2008/003008, mailed May 1, 2009.
Extended European Search Report for Patent Application No. 08846439.1, issued Dec. 9, 2013, 12 pages.
Third Office Action for Chinese Patent Application No. 200880124697.6, issued May 14, 2014, 17 pages (with English translation).
Office Action for Japanese Patent Application 2010-532671, mailed Nov. 27, 2012, 3 pages.
Author Unknown, "3GPP TSG-RAN WG1#49bis," Orlando, Florida, Jun. 25-29, 2007, 5 pages.
Notice of Preliminary Rejection for Korean Patent Application No. 10-2010-7012583, mailed Jan. 27, 2015, 12 pages.

* cited by examiner

UPLINK POWER CONTROL SCHEME FOR A WIRELESS COMMUNICATION SYSTEM

This application is a National Phase Application under 35 U.S.C. §371 of PCT/IB2008/003008, filed Nov. 7, 2008, which claims the benefit of U.S. provisional patent application Ser. No. 60/986,779, filed Nov. 9, 2007, the disclosures of which are hereby incorporated herein by reference in their entireties.

FIELD OF THE INVENTION

The present invention relates to uplink power control in a wireless communication system.

BACKGROUND

In the IEEE 802.16e standard, each base station serves a cell. Further, via the use of focused antennas, each cell is divided into a number of sectors. One issue with the IEEE 802.16e standard is that for both open loop and closed loop power control, transmit power of a subscribing station, which may be a mobile station, is determined without considering the amount of interference that is caused to neighboring sectors. This issue is particularly problematic with respect to subscribing stations that are located near an edge of the cell and are therefore transmitting at high power levels. Accordingly, there is a need for an uplink power control scheme that considers the amount of interference caused to neighboring sectors.

SUMMARY

The present invention relates to an uplink power control scheme for a wireless communication system. In general, a subscribing station is located within a serving sector of a cell served by a base station in a wireless communication network. In one embodiment, the subscribing station obtains interference parameters for one or more neighboring sectors of the serving sector of the subscribing station. In this embodiment, the interference parameters are Interference-over-Thermal (IoT) thresholds, or interference thresholds. The one or more neighboring sectors include one or more neighboring sectors in the cell in which the subscribing station is located and, optionally, one or more neighboring sectors in one or more neighboring cells. The subscribing station then controls a maximum transmit power, and thus a power headroom, of the subscribing station based on the interference thresholds for the one or more neighboring sectors. The subscribing station reports the power headroom to the base station. In response, the base station grants resources to the subscribing station for an uplink based on the reported power headroom of the subscribing station.

In another embodiment, bandwidth of each sector is divided or partitioned into a number of frequency zones. The subscribing station obtains interference thresholds for the frequency zones for one or more neighboring sectors of the serving sector of the subscribing station. Again, the one or more neighboring sectors include one or more neighboring sectors in the cell in which the subscribing station is located and, optionally, one or more neighboring sectors in one or more neighboring cells. For each frequency zone, the subscribing station controls a maximum transmit power, and thus a power headroom, of the subscribing station for the frequency zone based on the interference thresholds for the frequency zone for the one or more neighboring sectors. The subscribing station then reports the power headroom of the subscribing station for each of the frequency zones to the base station. In response, the base station selects a frequency zone for the subscribing station based on the power headrooms of the subscribing station for the frequency zones, and then grants resources to the subscribing station for an uplink in the selected frequency zone based on the power headroom of the subscribing station for the selected frequency zone.

In yet another embodiment, bandwidth of each sector is divided or partitioned into a number of frequency zones. For each sector in a cell, one of the frequency zones is an unrestricted IoT zone for the sector and the other frequency zones are restricted frequency zones for the sector. Each sector in the cell uses a different frequency zone as that sector's unrestricted IoT zone. In this embodiment, the subscribing station obtains interference thresholds for the frequency zones for one or more neighboring sectors of the serving sector of the subscribing station. Again, the one or more neighboring sectors include one or more neighboring sectors in the cell in which the subscribing station is located and, optionally, one or more neighboring sectors in one or more neighboring cells. Then, for each restricted frequency zone of the serving sector, the subscribing station controls the maximum transmit power, and thus a power headroom, of the subscribing station for the restricted frequency zone based on the interference thresholds for that frequency zone for the one or more neighboring sectors. For the unrestricted frequency zone, the maximum transmit power, and thus the power headroom, of the subscribing station is unaffected by the interference thresholds for that frequency zone of the one or more neighboring sectors. The subscribing station then reports the power headroom of the subscribing station for each of the frequency zones to the base station. In response, the base station determines whether the subscribing station is located near a cell edge based on the reported power headrooms of the subscribing station for the frequency zones. If the subscribing station is located near the cell edge, the base station selects the unrestricted IoT zone of the sector serving the mobile station as the frequency zone for the subscribing station. Otherwise, the base station may select any one of the frequency zones of the serving sector as the frequency zone for the subscribing station using any desired scheduling criteria. Once the frequency zone is selected for the subscribing station, the base station grants resources to the subscribing station for an uplink in the selected frequency zone of the serving sector based on the power headroom of the subscribing station for the selected frequency zone of the serving sector.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 6:
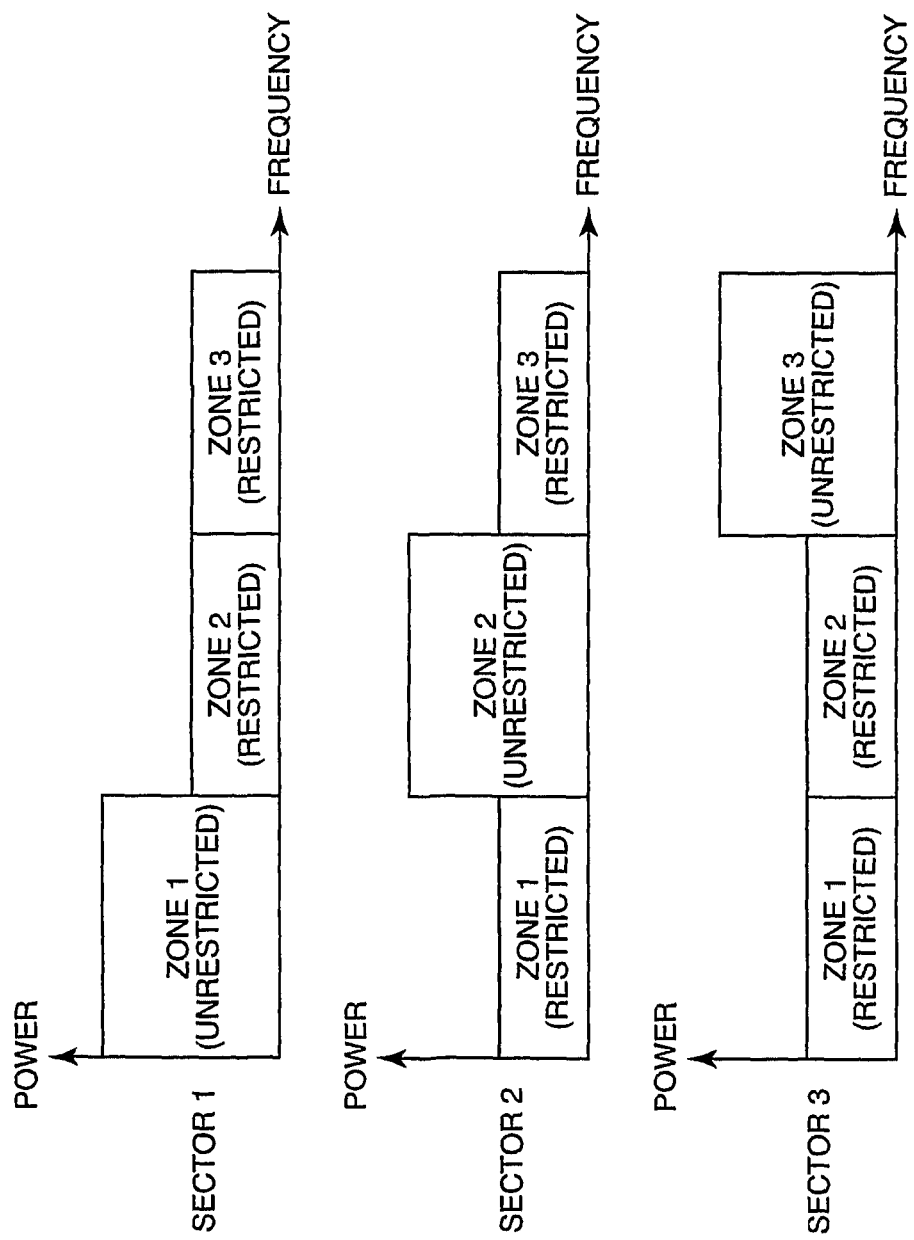
Figure 7:
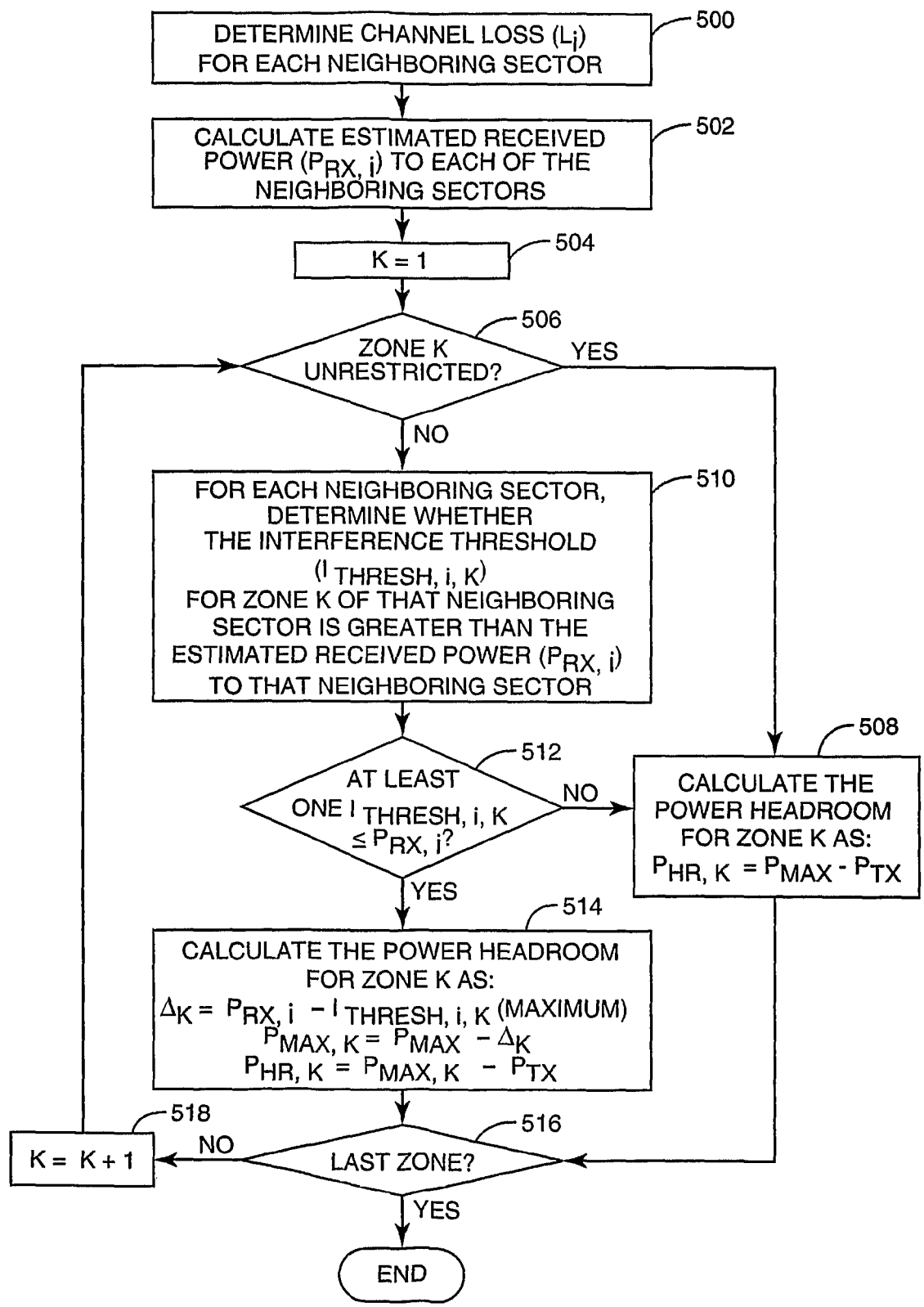
Figure 8:
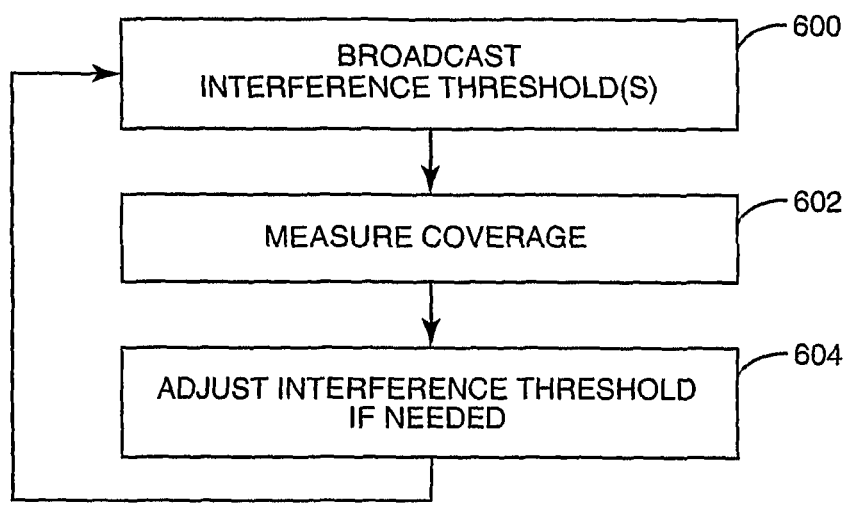
Figure 9:
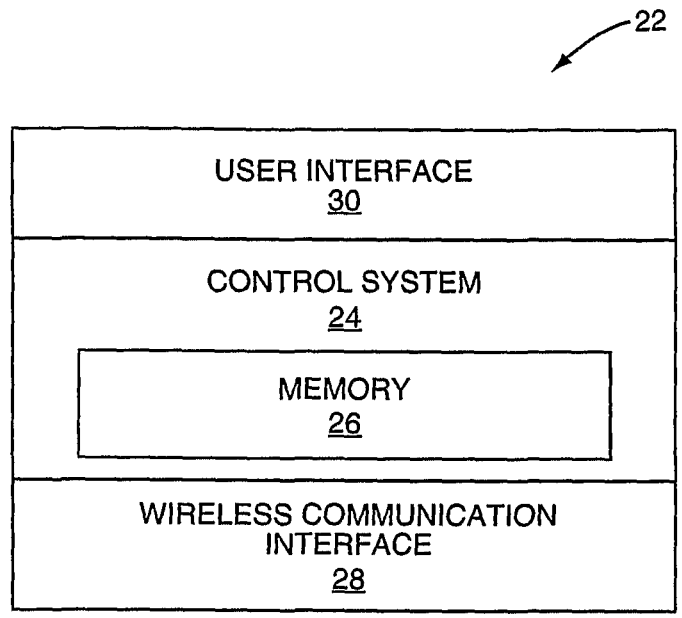
Figure 10:
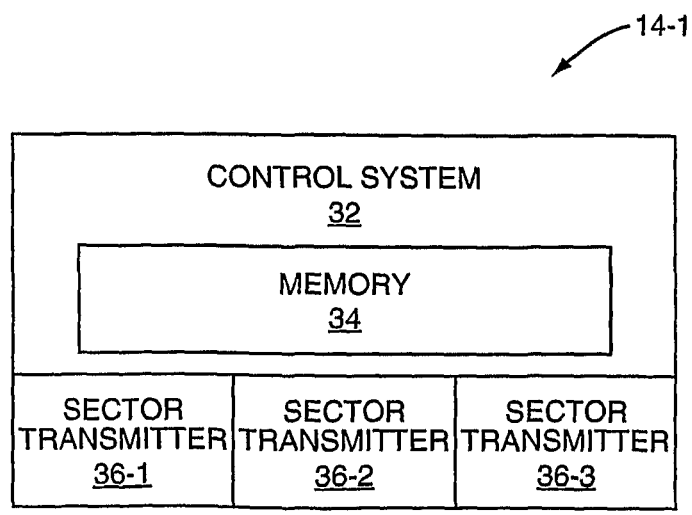

FIG. 6 graphically illustrates an embodiment of the present invention wherein a bandwidth of each sector of a cell is divided or partitioned into a number of frequency zones and each sector utilizes a different frequency zone as an unrestricted IoT zone;

FIG. 7 is a flow chart illustrating a process for controlling a maximum transmit power of the subscribing station and determining a power headroom of the subscribing station for each of the frequency zones of FIG. 6 based on the interference thresholds for the frequency zones for a number of neighboring sectors according to another embodiment of the present invention;

FIG. 8 is a flow chart illustrating a process for adaptively controlling interference thresholds according to one embodiment of the present invention;

FIG. 9 is a block diagram of an exemplary embodiment of a subscribing station; and FIG. 10 is a block diagram of an exemplary embodiment of a base station.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to an uplink power control scheme for a wireless communication network. In the preferred embodiment, the uplink power control scheme is an uplink power control scheme for an IEEE 802.16e or IEEE 802.16m standard. However, the present invention is not limited thereto. The present invention is equally applicable to any type of wireless communication network having cells and sectors wherein there is a desire to control transmit power of subscribing stations or client devices in a manner that considers interference caused to neighboring sectors. Further, as discussed below, in the preferred embodiment, Interference-over-Thermal (IoT) thresholds (hereinafter referred to as "interference thresholds") are used to control the amount of interference caused by transmissions by a subscribing station in a serving sector to one or more neighboring sectors. However, the present invention is not limited thereto. Other types of parameters related to loading or interference that are suitable for use to control the amount of interference caused to neighboring sectors may be used. Thus, the term "interference parameter" may be used herein to refer generally to any type of parameter such as, but not limited to, an interference threshold that may be used to control the amount of interference caused to neighboring sectors.

Figure 1:
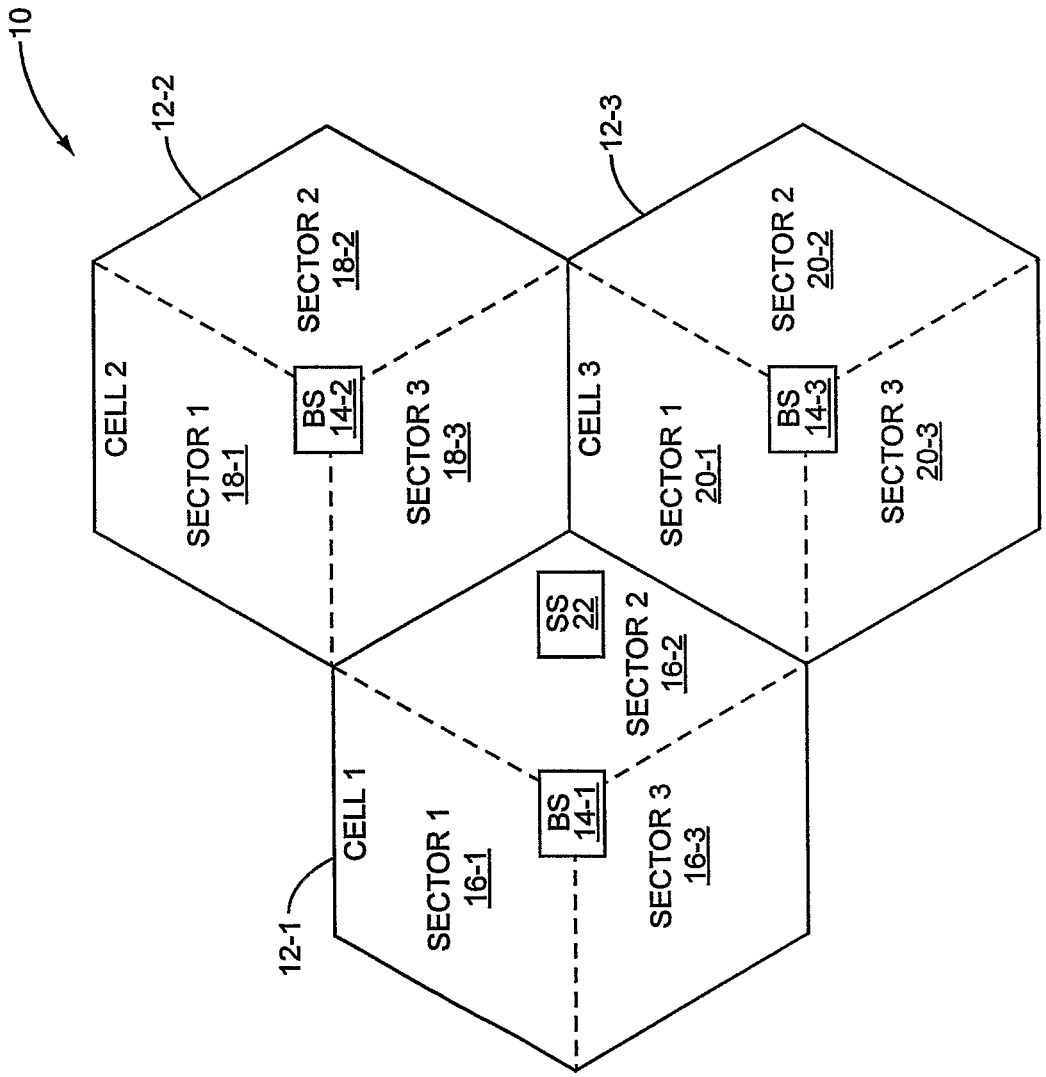
FIG. 1 illustrates a number of cells in a wireless communication network wherein each of the cells includes a number of sectors according to one embodiment of the present invention.

FIG. 1 illustrates a portion of a wireless communication network 10 according to one embodiment of the present invention. As illustrated, the wireless communication network 10 includes a number of cells 12-1, 12-2, and 12-3 (generally referred to herein as cells 12) having corresponding base stations 14-1, 14-2, and 14-3 (generally referred to herein as base stations 14). Note that while only three cells 12 are illustrated in FIG. 1, one of ordinary skill in the art will appreciate that the wireless communication network 10 may include any number of cells 12 and corresponding base stations 14. In this embodiment, the cell 12-1 is divided into a number of sectors 16-1, 16-2, and 16-3, which are generally referred to herein as sectors 16. Each of the sectors 16-1, 16-2, and 16-3 is defined by a corresponding transmitter (hereinafter "sector transmitter") (not shown) of the base station 14-1. Further, each of the sector transmitters of the base station 14-1 may include a focused antenna for communicating within the corresponding sector 16 and a broadcast antenna for broadcasting messages within and outside of the corresponding sector 16. Likewise, the cell 12-2 is divided into a number of sectors 18-1, 18-2, and 18-3, which are generally referred to herein as sectors 18; and the cell 12-3 is divided into a number of sectors 20-1, 20-2, and 20-3, which are generally referred to herein as sectors 20. Note that while in this example each of the cells 12 includes three sectors, the present invention is not limited thereto. Each of the cells may include any number of two or more sectors. In this example, a subscribing station 22 is located within the sector 16-2 of the cell 12-1 and is therefore served by the base station 14-1.

Figure 2:
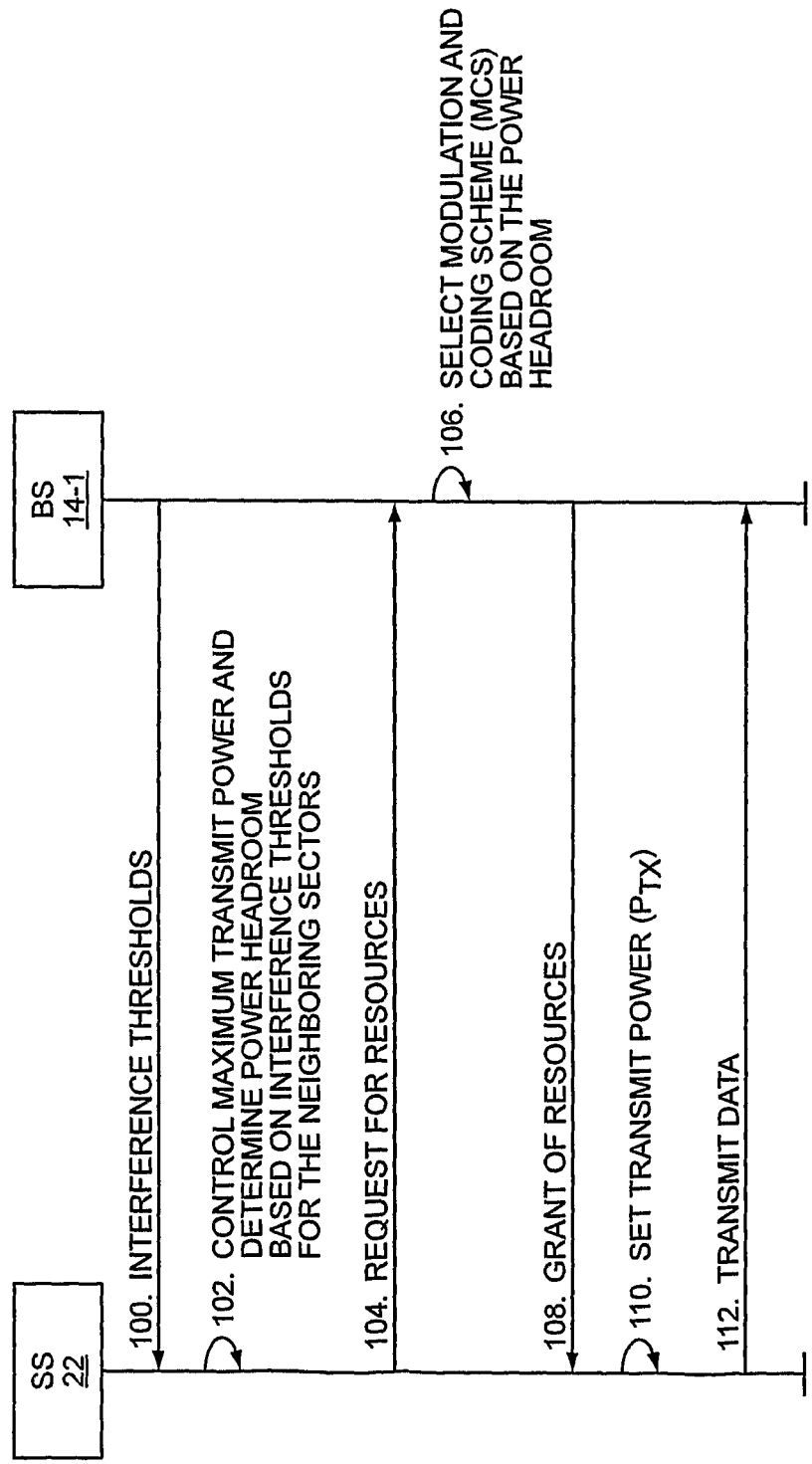
FIG. 2 illustrates operation of a base station and a subscribing station to provide uplink power control according to a first embodiment of the present invention.

FIG. 2 illustrates the operation of the base station 14-1 and the subscribing station 22 of FIG. 1 to provide uplink power control according to one embodiment of the present invention. This process is also preferably used by the base station 14-1 and other subscribing stations located within the cell 12-1 as well as by the other base stations 14-2 and 14-3 and subscribing stations located within the corresponding cells 12-2 and 12-3. First, the subscribing station 22 obtains interference thresholds for at least neighboring sectors of the sector 16-2 in which the subscribing station 22 is located (step 100). Since the sector 16-2 is serving the subscribing station 22 in this example, the sector 16-2 is also referred to herein as the serving sector 16-2 of the subscribing station 22. In this embodiment, the neighboring sectors of the serving sector 16-2 are the other sectors 16-1 and 16-3 in the cell 12-1 as well as the sectors 18-3 and 20-1 in the cells 12-2 and 12-3, respectively. However, in an alternative embodiment, the neighboring sectors may include only the other sectors 16-1 and 16-2 in the cell 12-1 that neighbor the serving sector 16-2. Note that in this example, each of the neighboring sectors 16-1, 16-3, 18-3, and 20-1 has an interference threshold. However, the present invention is not limited thereto. For example, in an alternative embodiment, each of the neighboring sectors 16-1, 16-3, 18-3, and 20-1 may or may not have an interference threshold. Preferably, at least one of the neighboring sectors 16-1, 16-3, 18-3, and 20-1 has an interference threshold.

In this embodiment, the sector transmitters of the base station 14-1 broadcast the interference thresholds for the sectors 16-1, 16-2, and 16-3 to subscribing stations in the cell 12-1 including the subscribing station 22. More specifically, the sector transmitter of the base station 14-1 for the sector 16-1 broadcasts the interference threshold for the sector 16-1, the sector transmitter of the base station 14-1 for the sector 16-2 broadcasts the interference threshold for the sector 16-2, and the sector transmitter of the base station 14-1 for the sector 16-3 broadcasts the interference threshold for the sector 16-3. In addition, the sector transmitters of the base stations 14-2 and 14-3 may broadcast the interference thresholds for the sectors 18-1, 18-2, and 18-3 and the sectors 20-1, 20-2, and 20-3, respectively. Alternatively, the base station 14-1 may also broadcast interference thresholds for sectors of neighboring cells including the sectors 18-1, 18-2, 18-3 of the neighboring cell 12-2 and the sectors 20-1, 20-2, and 20-3 of the neighboring cell 12-3. The base station 14-1 of the cell 12-1 may obtain the interference thresholds for the sectors of the neighboring cells 12-2 and 12-3 from, for example, the base stations 14-2 and 14-3 of the neighboring cells 12-2 and 12-3, via a backhaul network. The subscribing station 22 may maintain an active list of neighboring sectors, which may be used to identify the interference thresholds of the neighboring sectors 16-1, 16-3, 18-3, and 20-1 from the interference thresholds broadcast to the subscribing station 22.

Next, the subscribing station 22 controls a maximum transmit power of the subscribing station 22 and determines a power headroom of the subscribing station 22 based on the interference thresholds of the neighboring sectors 16-1, 16-3, 18-3, and 20-1 (step 102). The details of an exemplary process for controlling the maximum transmit power of the subscribing station 22 and determining the power headroom of the subscribing station 22 based on the interference thresholds of the neighboring sectors 16-1, 16-3, 18-3, and 20-1 is discussed below. In general, by taking the interference thresholds of the neighboring sectors 16-1, 16-3, 18-3, and 20-1 into account, the subscribing station 22 is enabled to control the maximum transmit power, and thus the power headroom, of the subscribing station 22 such that interference in the neighboring sectors 16-1, 16-3, 18-3, and 20-1 resulting from transmissions by the subscribing station 22 in the sector 16-2 is limited to a desired threshold value.

Once the power headroom of the subscribing station 22 is determined, the subscribing station 22 sends a request for resources to the base station 14-1 (step 104). The power headroom of the subscribing station 22 may be provided in the request for resources, provided in association with the request for resources, or otherwise provided to the base station 14-1 such that the power headroom is available when needed. In response to the request for resources, in this embodiment, the base station 14-1 selects a modulation and coding scheme (MCS) for the subscribing station 22 based on the power headroom of the subscribing station 22 (step 106). More specifically, in one embodiment, the base station 14-1 measures a Signal-to-Interference-plus-Noise-Ratio ($SINR_{CONTROL}$) on an uplink control channel. In open loop power control operation, the uplink control channel may be a bandwidth request channel over which the subscribing station 22 issued the request for resources in step 104. In closed loop operation, the uplink control channel may be measured on an uplink fast feedback control channel. A target SINR ($SINR_{DATA}$), may then be computed as:

$$SINR_{DATA} = SINR_{CONTROL} + P_{HR}(dB),$$

where $P_{HR}$ is the power headroom of the subscribing station 22 reported to the base station 14-1, and $SINR_{CONTROL}$ is the measured SINR on the uplink control channel. Then, based on the target SINR ($SINR_{DATA}$), the base station 14-1 selects the desired MCS, thereby allocating a desired amount of bandwidth to the subscribing station 22. More specifically, multiple MCSs may be used in the wireless communication network 10. Each MCS has an associated data rate. For example, IEEE 802.16e has the following MCSs: 64-QAM (Quadrature Amplitude Modulation) providing up to 12 Megabits-per-second (Mbps), 16-QAM providing up to 6 Mbps, and Quadrature Phase Shift Keying (QPSK) providing up to 3 Mbps. In addition to selecting the desired MCS, the base station 14-1 may perform other resource allocation tasks such as scheduling a time during which the subscribing station 22 is permitted to transmit. The base station 14-1 then sends a message to the subscribing station 22 granting resources to the subscribing station 22 (step 108). This message, or grant, includes information identifying the selected MCS for the subscribing station 22 and scheduling information identifying a time at which the subscribing station 22 is permitted to transmit. In addition, the grant may include various other types of information as will be appreciated by one of ordinary skill in the art.

The subscribing station 22 then sets a transmit power ($P_{TX}$) at which the subscribing station 22 will transmit (step 110) and transmits data according to the schedule provided in the grant from the base station 14-1 (step 112). More specifically, the manner in which the subscribing station 22 sets the transmit power ($P_{TX}$) of the subscribing station 22 varies depending on whether open loop power control or closed loop power control is utilized. In one embodiment, in the case of open loop power control, the subscribing station 22 determines the transmit power ($P_{TX}$) based on the equation:

$$P_{TX} = L_S + (N+I) + CINR_{DATA} + \Delta_{MS} + \Delta_{BS},$$

where $L_S$ is a path loss to the base station 14-1 for the serving sector 16-2, N+I is a noise plus interference term that is broadcast by the base station 14-1, and $CINR_{DATA}$ is a target Carrier to Interference plus Noise Ratio (CINR) that corresponds to the selected MCS for the subscribing station 22. $\Delta_{MS}$ is an offset value specific to the subscribing station 22 that may be determined by the base station 14-1 and provided to the subscribing station 22 in the grant of resources or via a separate unicast channel. $\Delta_{BS}$ is an offset value that is common to all subscribing stations within the cell 12-1 of the base station 14-1 and may be broadcast to the subscribing stations in the cell 12-1, including the subscribing station 22. In general, the offset values $\Delta_{MS}$ and $\Delta_{BS}$ compensate for the difference between the sum of $L_S$, N+I, and $CINR_{DATA}$ and the actual transmit power of the subscribing station 22. Thus, in open loop operation, the subscribing station 22 sets the transmit power of the subscribing station 22 to the calculated transmit power ($P_{TX}$). In another embodiment, the transmit power can be based on an equation that compensates for a fraction of the path loss.

In one embodiment, in the case of closed loop power control, a dedicated uplink fast feedback channel provides a closed loop path between the subscribing station 22 and the base station 14-1 by which the base station 14-1 controls the transmit power ($P_{TX}$) of the subscribing station 22 to achieve a desired SINR. The subscribing station 22 then sets the transmit power ($P_{TX}$) as instructed by the base station 14-1. Once the transmit power ($P_{TX}$) is set via either open loop or closed loop control, the subscribing station 22 transmits data, such as a packet, to the base station 14-1 at the desired transmit power ($P_{TX}$), and the base station 14-1 then communicates the transmitted data to a desired destination.

Figure 3:
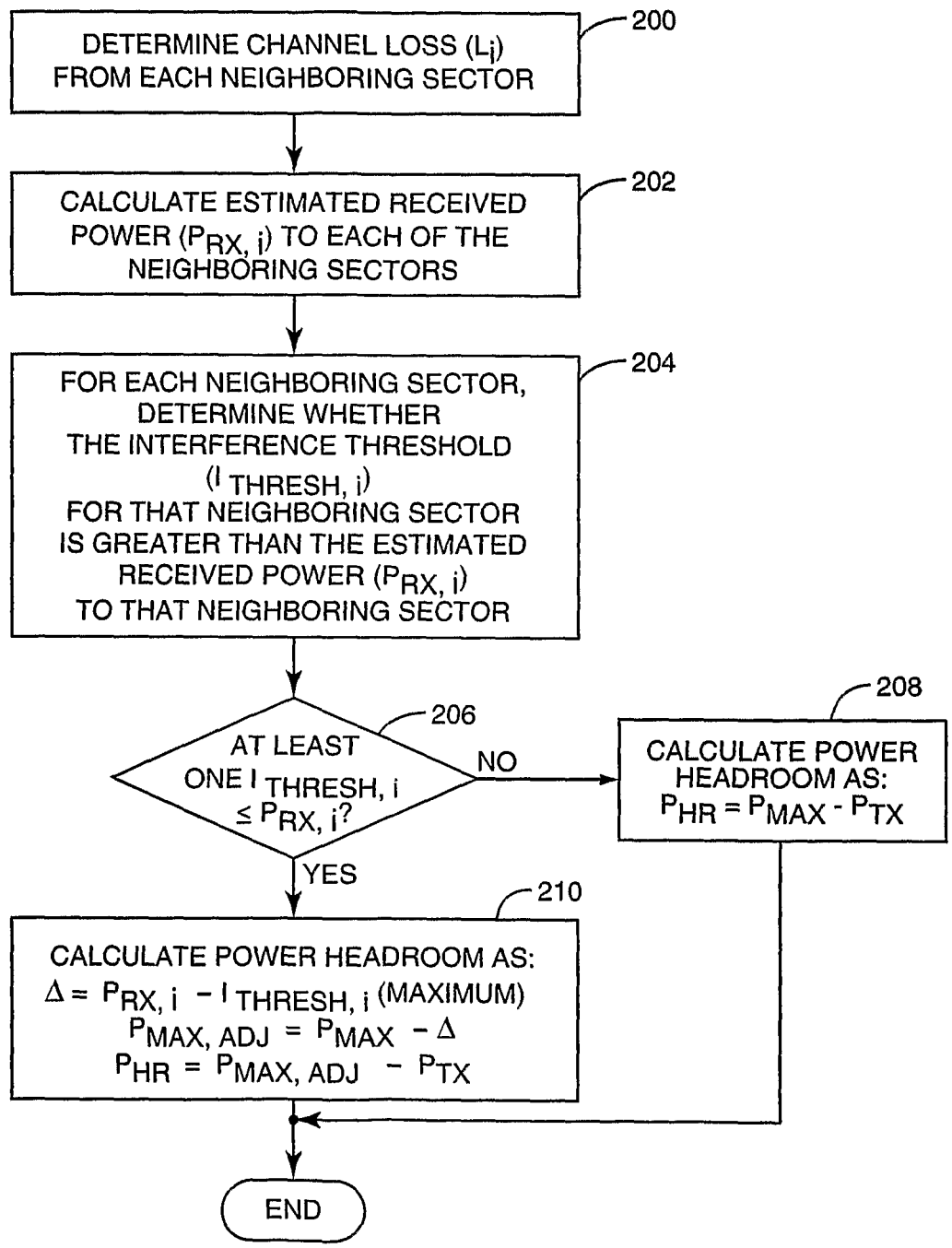
FIG. 3 is a flow chart illustrating a process for controlling a maximum transmit power, and thus a power headroom, of the subscribing station of FIGS. 1 and 2 based on interference thresholds for a number of neighboring sectors according to one embodiment of the present invention.

FIG. 3 is a flow chart illustrating a process for controlling a maximum transmit power and determining a power headroom of the subscribing station 22 of FIGS. 1 and 2 based on the interference thresholds for the neighboring sectors 16-1, 16-3, 18-3, and 20-1 according to one embodiment of the present invention. More specifically, FIG. 3 is a flow chart illustrating step 102 of FIG. 2 in more detail. First, the subscribing station 22 determines a channel loss ($L_i$) to each of the neighboring sectors 16-1, 16-3, 18-3, and 20-1 (step 200). More specifically, in one embodiment, the subscribing station 22 may determine the channel loss ($L_i$) to each of the neighboring sectors 16-1, 16-3, 18-3, and 20-1 by measuring a signal strength of a preamble, pilots, or reference symbols in messages received from the corresponding sector transmitters of the base stations 14-1, 14-2, and 14-3. For example, the subscribing station 22 may determine the channel loss ($L_i$) to the neighboring sector 16-1 based on a signal strength of a preamble, pilots, or reference symbols in messages broadcast by the sector transmitter of the base station 14-1 for the sector 16-1 and received by the subscribing station 22.

The subscribing station 22 then calculates, or otherwise determines, an estimated received power ($P_{RX,i}$) to each of the neighboring sectors 16-1, 16-3, 18-3, and 20-1 (step 202). Thus, as an example, the subscribing station 22 calculates an estimated received power ($P_{RX,i}$) to the sector transmitter for the sector 16-1 resulting from transmissions by the subscribing station 22 in the sector 16-2. More specifically, for each of the neighboring sectors 16-1, 16-3, 18-3, and 20-1, the estimated received power ($P_{RX,i}$) may be calculated based on the equation:

$$P_{RX,i} = P_{MAX} - L_i,$$

wherein $P_{MAX}$ is a maximum transmit power and is the channel loss for the sector. Note that $P_{MAX}$ may be a maximum transmit power for the subscribing station 22 or a maximum transmit power permitted in the sector. Further, if $P_{MAX}$ is a maximum transmit power permitted in the sector, the maximum transmit power $P_{MAX}$ may vary from sector to sector.

Then, for each neighboring sector of the neighboring sectors 16-1, 16-3, 18-3, and 20-1, the subscribing station 22 determines whether the interference threshold for the neighboring sector is greater than the estimated received power ($P_{RX,i}$) for the neighboring sector (step 204). In other words, for each neighboring sector, the subscribing station 22 determines whether the following criterion is satisfied:

$$I_{THRESH,i} > P_{RX,i},$$

where $I_{THRESH,i}$ is the interference threshold for the neighboring sector and $P_{RX,i}$ is the estimated received power for the neighboring sector.

The subscribing station 22 then determines whether the interference threshold ($I_{THRESH,i}$) for at least one neighboring sector is less than or equal to the corresponding estimated received power ($P_{RX,i}$) (step 206). If not, the maximum transmit power is a standard maximum transmit power ($P_{MAX}$), and the power headroom ($P_{HR}$) for the subscribing station 22 is calculated as:

$$P_{HR} = P_{MAX} - P_{TX},$$

where again $P_{MAX}$ is a standard maximum transmit power and $P_{TX}$ is the transmit power of the subscribing station 22 (step 208). In one embodiment, the transmit power ($P_{TX}$) used to calculate the power headroom ($P_{HR}$) may be the transmit power of the subscribing station 22 when transmitting either the fast feedback control channel or a bandwidth, or resource, request. If the interference threshold ($I_{THRESH,i}$) for at least one neighboring sector is less than or equal to the corresponding estimated received power ($P_{RX,i}$), then the maximum transmit power is adjusted or decreased from the standard maximum transmit power ($P_{MAX}$) and the power headroom ($P_{HR}$) for the subscribing station 22 is calculated as illustrated by the following equations:

$$\Delta = P_{RX,i} - I_{THRESH,i} \text{(MAXIMUM)}$$

$$P_{MAX,ADJ} = P_{MAX} - \Delta$$

$$P_{HR} = P_{MAX,ADJ} - P_{TX},$$

where $\Delta$ is a value corresponding to the difference between the estimated received power ($P_{RX,i}$) and the interference threshold ($I_{THRESH,i}$) for the neighboring sector having the greatest difference between $P_{RX,i}$ and $I_{THRESH,i}$ (step 210). Therefore, for example, if $P_{RX,i}$ is greater than $I_{THRESH,i}$ for the neighboring sectors 16-1 and 16-3, $\Delta$ is a maximum of the difference of $P_{RX,i}$ and $I_{THRESH,I}$ for the neighboring sector 16-1 and the difference of $P_{RX,i}$ and $I_{THRESH,I}$ for the neighboring sector 16-3. Again, $P_{MAX}$ is the standard maximum transmit power and $P_{TX}$ is the transmit power of the subscribing station 22. As stated above, in one embodiment, the transmit power ($P_{TX}$) used to calculate the power headroom ($P_{HR}$) may be the transmit power of the subscribing station 22 when transmitting either the fast feedback control channel or a bandwidth, or resource, request. Once the power headroom is calculated in either step 208 or step 210, the process ends.

Figure 4:
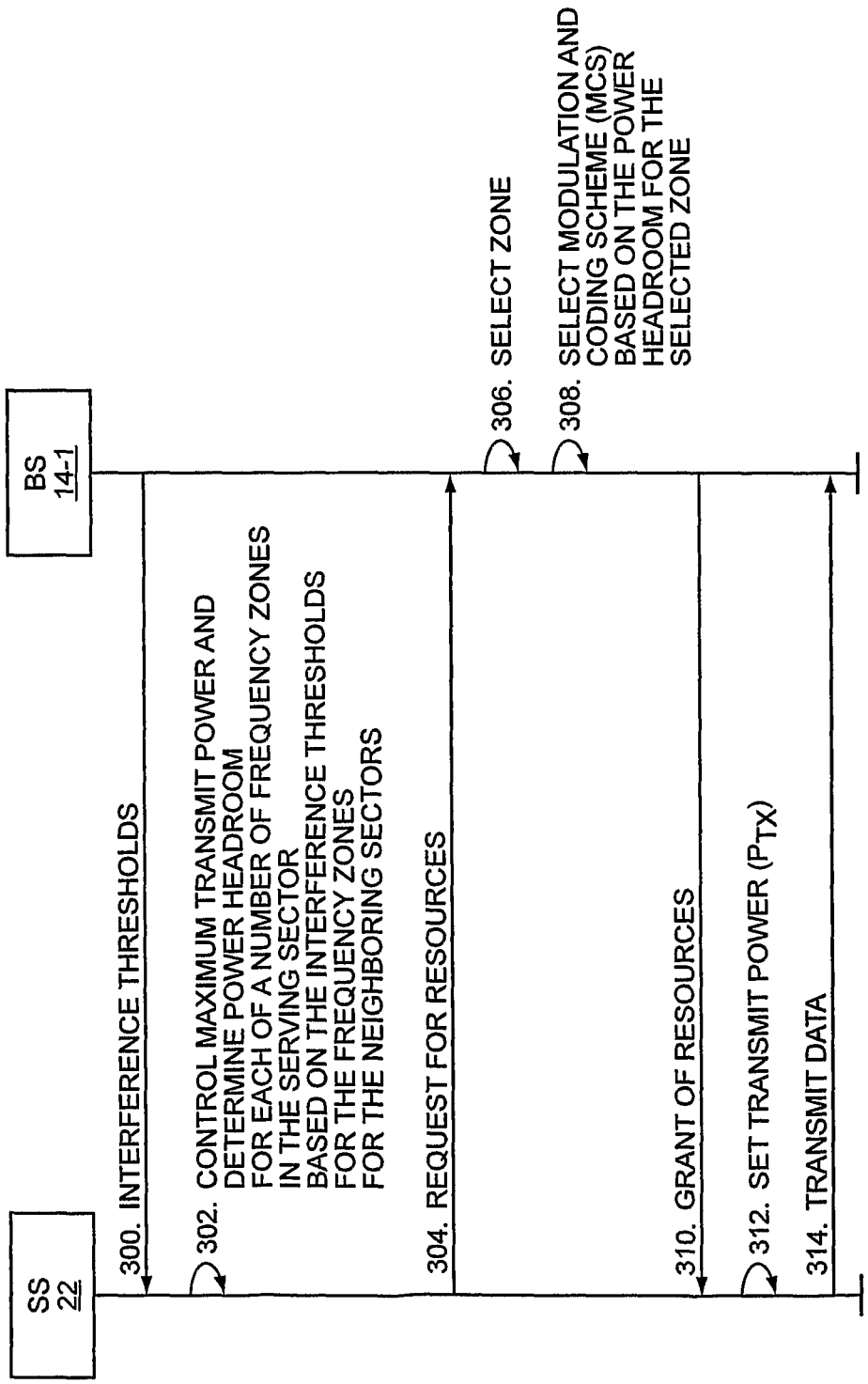
FIG. 4 illustrates the operation of a base station and a subscribing station to provide uplink power control wherein a bandwidth of each sector is divided or partitioned into a number of frequency zones according to a second embodiment of the present invention.

FIG. 4 illustrates the operation of the wireless communication network 10 of FIG. 1 to provide uplink power control based on interference thresholds for each of a number of frequency zones according to a second embodiment of the present invention. More specifically, in this example, a bandwidth of each of the sectors 16, 18, and 20 is divided or partitioned into a number of frequency zones. The frequency zones represent logical tones. The logical tones represented by a frequency zone may be contiguous or spread out over the entire bandwidth. For example, for IEEE 802.16m, a frequency zone may represent a number of contiguous logical tones in the case of an Adaptive Modulation and Coding (AMC) channel or a number of logical tones spread out over the entire bandwidth of the sector in the case of a diversity channel.

In operation, the subscribing station 22 obtains interference thresholds for each of the frequency zones for at least neighboring sectors of the sector 16-2 in which the subscribing station 22 is located (step 300). Since the sector 16-2 is serving the subscribing station 22 in this example, the sector 16-2 is also referred to herein as the serving sector 16-2 of the subscribing station 22. In this embodiment, the neighboring sectors of the serving sector 16-2 are the other sectors 16-1 and 16-3 in the cell 12-1 as well as the sectors 18-3 and 20-1 in the cells 12-2 and 12-3, respectively. However, in an alternative embodiment, the neighboring sectors may include only the other sectors 16-1 and 16-2 in the cell 12-1 that neighbor the serving sector 16-2. Note that in this example, each of the neighboring sectors 16-1, 16-3, 18-3, and 20-1 has an interference threshold for each of the frequency zones. However, the present invention is not limited thereto. Each of the neighboring sectors 16-1, 16-3, 18-3, and 20-1 may have interference thresholds for any number of the frequency zones or even none of the frequency zones. However, preferably, at least one of the neighboring sectors 16-1, 16-3, 18-3, and 20-1 has an interference threshold for at least one of the frequency zones.

In this embodiment, the sector transmitters of the base station 14-1 broadcast the interference thresholds for the frequency zones for the sectors 16-1, 16-2, and 16-3 to subscribing stations in the cell 12-1 including the subscribing station 22. More specifically, the sector transmitter of the base station 14-1 for the sector 16-1 broadcasts the interference thresholds for the frequency zones for the sector 16-1, the sector transmitter of the base station 14-1 for the sector 16-2 broadcasts the interference thresholds for the frequency zones for the sector 16-2, and the sector transmitter of the base station 14-1 for the sector 16-3 broadcasts the interference thresholds for the frequency zones for the sector 16-3. In addition, the sector transmitters of the base stations 14-2 and 14-3 may broadcast the interference thresholds for the frequency zones for the sectors 18-1, 18-2, and 18-3 and the sectors 20-1, 20-2, and 20-3, respectively. Alternatively, the base station 14-1 may also broadcast interference thresholds for the frequency zones for sectors of neighboring cells including the sectors 18-1, 18-2, 18-3 of the neighboring cell 12-2 and the sectors 20-1, 20-2, and 20-3 of the neighboring cell 12-3. The base station 14-1 may obtain the interference thresholds for the frequency zones for the sectors of the neighboring cells 12-2 and 12-3 from the base stations 14-2 and 14-3 of the neighboring cells 12-2 and 12-3 via a backhaul network. The subscribing station 22 may maintain an active list of neighboring sectors, which may be used to identify the interference thresholds of the neighboring sectors 16-1, 16-3, 18-3, and 20-1 from the interference thresholds broadcast to the subscribing station 22.

Next, the subscribing station 22 controls the maximum transmit power of the subscribing station 22 and determines a power headroom of the subscribing station 22 for each of the frequency zones based on the interference thresholds for the frequency zones for the neighboring sectors 16-1, 16-3, 18-3, and 20-1 (step 302). The details of an exemplary process for controlling the maximum transmit power of the subscribing station 22 and determining the power headroom of the subscribing station 22 for each of the frequency zones based on the interference thresholds of the neighboring sectors 16-1, 16-3, 18-3, and 20-1 is discussed below. In general, by taking the interference thresholds of the neighboring sectors 16-1, 16-3, 18-3, and 20-1 into account, the subscribing station 22 is enabled to control the maximum transmit power, and thus power headroom, of the subscribing station 22 for each of the frequency zones such that interference in the neighboring sectors 16-1, 16-3, 18-3, and 20-1 resulting from transmissions by the subscribing station 22 in the sector 16-2 is limited.

Once the power headroom of the subscribing station 22 for each of the frequency zones is determined, the subscribing station 22 sends a request for resources to the base station 14-1 (step 304). The power headroom of the subscribing station 22 for each of the frequency zones may be provided in the request for resources, provided in association with the request for resources, or otherwise provided to the base station 14-1 such that the power headrooms are available when needed. In response to the request for resources, in this embodiment, the base station 14-1 selects a frequency zone for the subscribing station 22 based on the power headrooms of the subscribing station 22 for the frequency zones (step 306). For example, the base station 14-1 may select the frequency zone for which the subscribing station 22 has the greatest power headroom.

The base station 14-1 then selects a MCS for the subscribing station 22 based on the power headroom of the subscribing station 22 for the selected frequency zone (step 308). More specifically, in one embodiment, the base station 14-1 measures a Signal-to-Interference-plus-Noise-Ratio ($SINR_{CONTROL}$) on an uplink control channel. In open loop power control operation, the uplink control channel may be a bandwidth request channel over which the subscribing station 22 issued the request for resources in step 304. In closed loop operation, the uplink control channel may be measured on an uplink fast feedback control channel. A target SINR ($SINR_{DATA}$), may then be computed as:

$$SINR_{DATA} = SINR_{CONTROL} + P_{HR,k}(\text{dB}),$$

where $P_{HR,k}$ is the power headroom of the subscribing station 22 reported to the base station 14-1 for the selected frequency zone and $SINR_{CONTROL}$ is the measured SINR on the uplink control channel. Then, based on the target SINR ($SINR_{DATA}$), the base station 14-1 selects the desired MCS, thereby allocating a desired amount of bandwidth to the subscribing station 22. In addition to selecting the desired MCS, the base station 14-1 may perform other resource allocation tasks such as scheduling a time during which the subscribing station 22 is permitted to transmit. The base station 14-1 then sends a message to the subscribing station 22 granting resources to the subscribing station 22 (step 310). This message, or grant, includes information identifying the selected frequency zone and MCS for the subscribing station 22 and scheduling information identifying a time at which the subscribing station 22 is permitted to transmit. In addition, the grant may include various other types of information as will be appreciated by one of ordinary skill in the art.

The subscribing station 22 then sets a transmit power ($P_{TX}$) at which the subscribing station 22 will transmit (step 312) and transmits data according to the schedule provided in the grant from the base station 14-1 (step 314). More specifically, as discussed above, the manner in which the subscribing station 22 sets the transmit power ($P_{TX}$) of the subscribing station 22 varies depending on whether open loop power control or closed loop power control is utilized. In one embodiment, in the case of open loop power control, the subscribing station 22 determines the transmit power ($P_{TX}$) based on the equation:

$$P_{TX} = L_S + (N+I) + CINR_{DATA} + \Delta_{MS} + \Delta_{BS},$$

where $L_S$ is a path loss to the base station 14-1 for the serving sector 16-2, N+I is a noise plus interference term that is broadcast by the base station 14-1, and $CINR_{DATA}$ is a target Carrier to Interference plus Noise Ratio (CINR) that corresponds to the selected MCS for the subscribing station 22. $\Delta_{MS}$ is an offset value specific to the subscribing station 22 that may be determined by the base station 14-1 and provided to the subscribing station 22 in the grant of resources or via a separate unicast channel. $\Delta_{BS}$ is an offset value that is common to all subscribing stations within the cell 12-1 of the base station 14-1 and may be broadcast to the subscribing stations in the cell 12-1 including the subscribing station 22. Thus, in open loop operation, the subscribing station 22 then sets the transmit power to the calculated transmit power ($P_{TX}$). In another embodiment, the transmit power can be based on an equation that compensates for a fraction of the path loss.

In one embodiment, in the case of closed loop power control, a dedicated uplink fast feedback channel provides a closed loop path between the subscribing station 22 and the base station 14-1 by which the base station 14-1 controls the transmit power ($P_{TX}$) of the subscribing station 22 to achieve a desired SINR. The subscribing station 22 then sets the transmit power ($P_{TX}$) as instructed by the base station 14-1. Once the transmit power ($P_{TX}$) is set via either open loop or closed loop control, the subscribing station 22 transmits data, such as a packet, to the base station 14-1 at the desired transmit power ($P_{TX}$), and the base station 14-1 then communicates the transmitted data to a desired destination.

Figure 5:
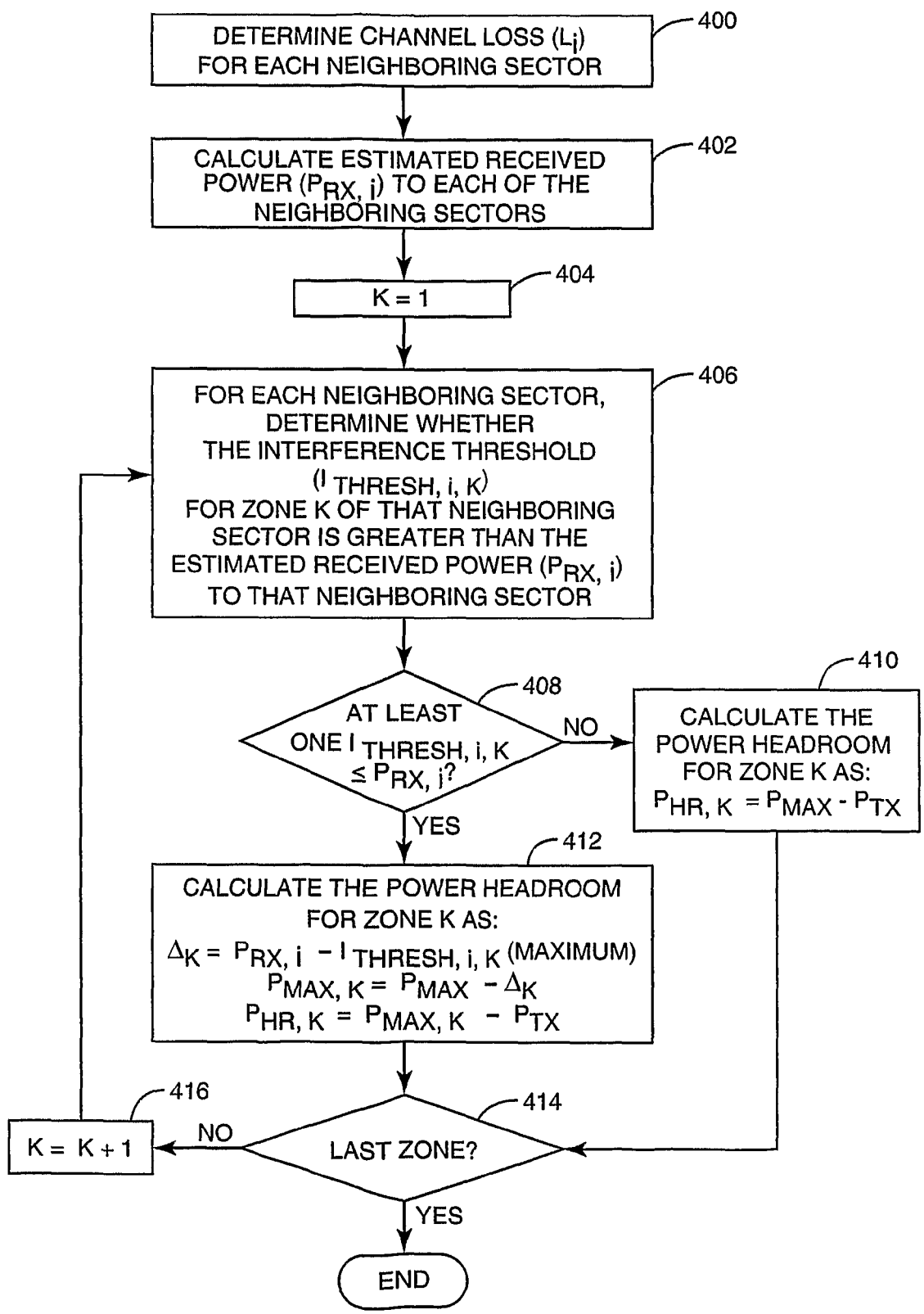
FIG. 5 is a flow chart illustrating a process for controlling a maximum transmit power of the subscribing station and determining a power headroom of the subscribing station of FIG. 4 for each of the frequency zones based on interference thresholds for the frequency zones for a number of neighboring sectors according to one embodiment of the present invention.

FIG. 5 is a flow chart illustrating a process for controlling a maximum transmit power and determining a power headroom of the subscribing station 22 of FIGS. 1 and 4 for each of a number of frequency zones based on the interference thresholds for the neighboring sectors 16-1, 16-3, 18-3, and 20-1 according to one embodiment of the present invention. More specifically, FIG. 5 is a flow chart illustrating step 302 of FIG. 4 in more detail. First, the subscribing station 22 determines a channel loss ($L_i$) to each of the neighboring sectors 16-1, 16-3, 18-3, and 20-1 (step 400). The subscribing station 22 then calculates, or otherwise determines, an estimated received power ($P_{RX,i}$) to each of the neighboring sectors 16-1, 16-3, 18-3, and 20-1 (step 402). Thus, as an example, the subscribing station 22 calculates an estimated received power ($P_{RX,i}$) to the sector transmitter for the sector 16-1 resulting from transmissions by the subscribing station 22 in the sector 16-2. More specifically, for each of the neighboring sectors 16-1, 16-3, 18-3, and 20-1, the estimated received power ($P_{RX,i}$) may be calculated based on the equation:

$$P_{RX,i} = P_{MAX} - L_i,$$

wherein $P_{MAX}$ is a standard maximum transmit power and $L_i$ is the channel loss for the sector. Note that $P_{MAX}$ may be a standard maximum transmit power for the subscribing station 22 or a standard maximum transmit power permitted in the sector. Further, if $P_{MAX}$ is a standard maximum transmit power permitted in the sector, the standard maximum transmit power $P_{MAX}$ may vary from sector to sector.

Then, a variable k is set to 1 (step 404). Next, for each neighboring sector of the neighboring sectors 16-1, 16-3, 18-3, and 20-1, the subscribing station 22 determines whether the interference threshold of the neighboring sector for zone k is greater than the estimated received power ($P_{RX,i}$) for the neighboring sector (step 406). In other words, for each neighboring sector, the subscribing station 22 determines whether the following criterion is satisfied:

$$I_{THRESH,i,k} > P_{RX,i},$$

where $I_{THRESH,i,k}$ is the interference threshold for the neighboring sector for zone k and $P_{RX,i}$ is the estimated received power for the neighboring sector.

The subscribing station 22 then determines whether the interference threshold ($I_{THRESH,i,k}$) for at least one neighboring sector for zone k is less than or equal to the corresponding estimated received power ($P_{RX,i}$) (step 408). If not, then the standard maximum transmit power is used to determine the power headroom ($P_{HR,k}$) for the subscribing station 22 for zone k using the equation:

$$P_{HR,k} = P_{MAX} - P_{TX},$$

where again $P_{MAX}$ is the standard maximum transmit power and $P_{TX}$ is the transmit power of the subscribing station 22 (step 410). In one embodiment, the transmit power ($P_{TX}$) used to calculate the power headroom ($P_{HR,k}$) may be the transmit power of the subscribing station 22 when transmitting either the fast feedback control channel or a bandwidth, or resource, request. If the interference threshold ($I_{THRESH,i,k}$) for at least one neighboring sector is less than or equal to the corresponding estimated received power ($P_{RX,i}$), then the maximum transmit power is adjusted or decreased from the standard maximum transmit power ($P_{MAX}$) and the power headroom ($P_{HR,k}$) for the subscribing station 22 for zone k is calculated based on the adjusted maximum transmit power as illustrated by the following equations:

$$\Delta_k = P_{RX,i} - I_{THRESH,i,k} (\text{MAXIMUM})$$

$$P_{MAX,k} = P_{MAX} - \Delta_k$$

$$P_{HR,k} = P_{MAX,k} - P_{TX},$$

where $\Delta_k$ is a value corresponding to the difference between the estimated received power ($P_{RX,i}$) and the interference threshold ($I_{THRESH,i,k}$) for zone k for the neighboring sector having the greatest different between $P_{RX,i}$ and $I_{THRESH,i,k}$ (step 412). Therefore, for example, if $P_{RX,i}$ is greater than $I_{THRESH,i,k}$ for the neighboring sectors 16-1 and 16-3, $\Delta_k$ is a maximum of the difference of $P_{RX,i}$ and $I_{THRESH,i,k}$ for the neighboring sector 16-1 and the difference of $P_{RX,i}$ and $I_{THRESH,i,k}$ for the neighboring sector 16-3. Again, $P_{MAX}$ is the standard maximum transmit power and $P_{TX}$ is the transmit power of the subscribing station 22. As stated above, in one embodiment, the transmit power ($P_{TX}$) used to calculate the power headroom ($P_{HR,k}$) may be the transmit power of the subscribing station 22 when transmitting either the fast feedback control channel or a bandwidth, or resource, request.

Once the power headroom is calculated in either step 410 or step 412, the subscribing station 22 determines whether the last frequency zone has been reached (step 414). If not, the variable k is incremented by one (step 416), and the process returns to step 406 to calculate the power headroom for the next frequency zone. Once the power headroom of the subscribing station 22 for each of the frequency zones has been calculated, the process ends.

FIG. 6 graphically illustrates an embodiment of the present invention wherein a bandwidth of each sector of a cell is divided or partitioned into a number of frequency zones and each sector utilizes a different frequency zone as an unrestricted IoT zone. In this embodiment, frequency zone 1 is unrestricted in sector 1 and restricted in frequency zones 2 and 3, frequency zone 2 is unrestricted in sector 2 and restricted in frequency zones 1 and 3, and frequency zone 3 is unrestricted in sector 3 and restricted in frequency zones 1 and 2. Thus, using the cell 12-1 (FIG. 1) as an example, frequency zone 1 is unrestricted in sector 16-1 (sector 1) and restricted in frequency zones 16-2 and 16-3 (sectors 2 and 3), frequency zone 2 is unrestricted in sector 16-2 (sector 2) and restricted in frequency zones 16-1 and 16-3 (sectors 1 and 3), and frequency zone 3 is unrestricted in sector 16-3 (sector 3) and restricted in frequency zones 16-1 and 16-2 (sectors 1 and 2).

As discussed below, in one embodiment, subscribing stations located near the edge of the cell 12-1 are scheduled in the unrestricted frequency zones of their serving sectors. Thus, if the subscribing station 22 is determined to be near the edge of the cell 12-1, the base station 14-1 schedules the subscribing station 22 in the unrestricted frequency zone (frequency zone 2) of the sector 16-2 (sector 2). Since the neighboring sectors 16-1, 16-3, 18-3, and 20-1 schedule their cell edge subscribing stations in different frequency zones, the channel condition improves for cell edge subscribing stations.

FIG. 7 is a flow chart illustrating a process for controlling a maximum transmit power and determining a power headroom of the subscribing station 22 for each of the frequency zones of FIG. 6 based on the interference thresholds for the frequency zones for the neighboring sectors 16-1, 16-3, 18-3, and 20-1 according to another embodiment of the present invention. More specifically, FIG. 7 is a flow chart illustrating step 302 of FIG. 4 in more detail for an embodiment wherein one frequency zone of the serving sector 16-2 is utilized as an unrestricted frequency zone as discussed above with respect to FIG. 6.

First, the subscribing station 22 determines a channel loss ($L_i$) to each of the neighboring sectors 16-1, 16-3, 18-3, and 20-1 (step 500). The subscribing station 22 then calculates, or otherwise determines, an estimated received power ($P_{RX,i}$) to each of the neighboring sectors 16-1, 16-3, 18-3, and 20-1 (step 502). Thus, as an example, the subscribing station 22 calculates an estimated received power ($P_{RX,i}$) to the sector transmitter for the sector 16-1 resulting from transmissions by the subscribing station 22 in the serving sector 16-2. More specifically, for each of the neighboring sectors 16-1, 16-3,

18-3, and 20-1, the estimated received power ($P_{RX,i}$) may be calculated based on the equation:

$$P_{RX,i} = P_{MAX} - L_i,$$

wherein $P_{MAX}$ is a standard maximum transmit power and $L_i$ is the channel loss for the sector. Note that $P_{MAX}$ may be a standard maximum transmit power for the subscribing station 22 or a standard maximum transmit power permitted in the sector. Further, if $P_{MAX}$ is a standard maximum transmit power permitted in the sector, the standard maximum transmit power $P_{MAX}$ may vary from sector to sector. Still further, the standard maximum transmit power $P_{MAX}$ may vary from one frequency zone to another. For instance, the unrestricted frequency zone for a sector may have a higher standard maximum transmit power $P_{MAX}$ than the restricted frequency zones for that sector.

Then, a variable k is set to 1 (step 504). Next, the subscribing station 22 determines whether frequency zone k is the unrestricted frequency zone for the serving sector 16-2 (step 506). If the frequency zone k is the unrestricted frequency zone for the serving sector 16-2, then the standard maximum transmit power is used to determine the power headroom for the subscribing station 22 for the frequency zone k using the equation:

$$P_{HR,k} = P_{MAX} - P_{TX},$$

where $P_{MAX}$ is the standard maximum transmit power and $P_{TX}$ is the transmit power of the subscribing station 22 (step 508). Again, note that the standard maximum transmit power $P_{MAX}$ may be different for each of the frequency zones or may be different for the unrestricted and restricted frequency zones. In one embodiment, the transmit power ($P_{TX}$) used to calculate the power headroom ($P_{HR,k}$) may be the transmit power of the subscribing station 22 when transmitting either the fast feedback control channel or a bandwidth, or resource, request. By calculating the frequency headroom ($P_{HR,k}$) for the unrestricted frequency zone as the difference between the standard maximum transmit power ($P_{MAX}$) and the transmit power ($P_{TX}$), the subscribing station 22 essentially uses infinity or some maximum value as the interference threshold for the frequency zone for the neighboring sectors 16-1, 16-3, 18-3, and 20-1.

Returning to step 506, if the frequency zone k is not the unrestricted frequency zone of the serving sector 16-2, then for each neighboring sector of the neighboring sectors 16-1, 16-3, 18-3, and 20-1, the subscribing station 22 determines whether the interference threshold of the neighboring sector for the frequency zone k is greater than the estimated received power ($P_{RX,i}$) for the neighboring sector (step 510). In other words, for each neighboring sector, the subscribing station 22 determines whether the following criterion is satisfied:

$$I_{THRESH,i,k} > P_{RX,i},$$

where $I_{THRESH,i,k}$ is the interference threshold for the neighboring sector for the frequency zone k and $P_{RX,i}$ is the estimated received power for the neighboring sector.

The subscribing station 22 then determines whether the interference threshold ($I_{THRESH,i,k}$) for at least one neighboring sector for the frequency zone k is less than or equal to the corresponding estimated received power ($P_{RX,i}$) (step 512). If not, then the maximum standard transmit power is used to determinate the power headroom ($P_{HR,k}$) for the subscribing station 22 for the frequency zone k is calculated using the equation:

$$P_{HR,k} = P_{MAX} - P_{TX},$$

where again $P_{MAX}$ is the standard maximum transmit power and $P_{TX}$ is the transmit power of the subscribing station 22 (step 508). Again, in one embodiment, the transmit power ($P_{TX}$) used to calculate the power headroom ($P_{HR,k}$) may be the transmit power of the subscribing station 22 when transmitting either the fast feedback control channel or a bandwidth, or resource, request. If the interference threshold ($I_{THRESH,i,k}$) for at least one neighboring sector is less than or equal to the corresponding estimated received power ($P_{RX,i}$), then the maximum transmit power is adjusted or decreased from the standard maximum transmit power ($P_{MAX}$) and the power headroom ($P_{HR,k}$) for the subscribing station 22 for the frequency zone k is calculated based on the adjusted maximum transmit power as illustrated by the following equations:

$$\Delta_k = P_{RX,i} - I_{THRESH,i,k} (\text{MAXIMUM})$$

$$P_{MAX,k} = P_{MAX} - \Delta_k$$

$$P_{HR,k} = P_{MAX,k} - P_{TX},$$

where $\Delta_k$ is a value corresponding to the difference between the estimated received power ($P_{RX,i}$) and the interference threshold ($I_{THRESH,i,k}$) for the frequency zone k for the neighboring sector having the greatest different between $P_{RX,i}$ and $I_{THRESH,i,k}$ (step 514). Therefore, for example, if $P_{RX,i}$ is greater than $I_{THRESH,i,k}$ for the neighboring sectors 16-1 and 16-3, $\Delta_k$ is a maximum of the difference of $P_{RX,i}$ and $I_{THRESH,i,k}$ for the neighboring sector 16-1 and the difference of $P_{RX,i}$ and $I_{THRESH,i,k}$ for the neighboring sector 16-3. Again, $P_{MAX}$ is the standard maximum transmit power and $P_{TX}$ is the transmit power of the subscribing station 22. As stated above, in one embodiment, the transmit power ($P_{TX}$) used to calculate the power headroom ($P_{HR,k}$) may be the transmit power of the subscribing station 22 when transmitting either the fast feedback control channel or a bandwidth, or resource, request.

Once the power headroom is calculated in either step 508 or step 514, the subscribing station 22 determines whether the last frequency zone has been reached (step 516). If not, the variable k is incremented by one (step 518), and the process returns to step 506 to calculate the power headroom for the next frequency zone. Once the power headroom of the subscribing station 22 for each of the frequency zones has been calculated, the process ends.

As discussed above with respect to FIG. 4, the subscribing station 22 thereafter provides the power headrooms for the frequency zones to the base station 14-1. Then, in response to receiving the request for resources from the subscribing station 22, the base station 14-1 selects a frequency zone for the subscribing station 22 based on the reported power headrooms of the subscribing station 22 for the frequency zones. More specifically, in this embodiment, the base station 14-1 determines whether the subscribing station 22 is located near the cell edge of the cell 12-1 based on the power headrooms. For instance, if the subscribing station 22 is located near the cell edge, the power headrooms for the restricted frequency zones may be less than a predetermined threshold value. The predetermined threshold value may be zero or some minimum power headroom needed to transmit in the restricted frequency zones. Once the base station 14-1 determines that the subscribing station 22 is located near the cell edge, the base station 14-1 selects the unrestricted frequency zone for the serving sector 16-2, which in this example is frequency zone 2, as the frequency zone for the subscribing station 22. In contrast, if the subscribing station 22 is not located near the cell edge, the base station 14-1 may schedule the subscribing station 22 in any one of the unrestricted or restricted frequency zones for the serving sector 16-2 or in one of the restricted frequency zones for the serving sector 16-2 using any desired scheduling criteria. In this manner, the base station 14-1 schedules each cell edge subscribing station in the unrestricted frequency zone of the serving sector of the cell edge subscribing station. Further, using the sector 16-2 as an example, since the unrestricted frequency zones of the neighboring sectors 16-1, 16-3, 18-3, and 20-1 are different than the unrestricted frequency zone of the sector 16-2, the channel condition is improved for cell edge subscribing stations in the sector 16-2 as well as cell edge subscribing stations in the neighboring sectors 16-1, 16-3, 18-3, and 20-1.

FIG. 8 is a flow chart illustrating a process for adaptively adjusting one or more interference thresholds according to one embodiment of the present invention. First, the base station, which in this example is base station 14-1, broadcasts interference thresholds for the cell 12-1 (step 600). More specifically, in one embodiment, the base station 14-1 broadcasts one or more interference thresholds for each of the sectors 16 via corresponding sector transmitters. Note that multiple interference thresholds may be broadcast for each sector 16 where the bandwidth of the sectors 16 is divided into a number of frequency zones, as described above. Next, the base station 14-1 measures coverage in the cell 12-1 (step 602). The base station 14-1 then adjusts the interference thresholds for the sectors 16 based on the measured coverage (step 604). More specifically, in one embodiment, the base station 14-1 may measure IoT in each sector 16. Further, if frequency zones are used, the base station 14-1 may measure IoT in each frequency zone for each sector 16. The base station 14-1 may then adjust the interference thresholds to either increase or decrease IoT in the corresponding sectors and, depending on the embodiment, frequency zones as desired. The process then returns to step 600. In this manner, the base station 14-1 may adaptively adjust the interference thresholds to achieve the desired IoT(s) in each of the sectors 16.

FIG. 9 is a block diagram of an exemplary embodiment of the subscribing station 22. In general, the subscribing station 22 includes a control system 24 having associated memory 26. In addition, the subscribing station 22 includes a wireless communication interface 28. The functionality of the subscribing station 22 discussed above with respect to uplink power control may be implemented within a protocol stack of the wireless communication interface 28, implemented in software stored in the memory 26, or a combination thereof. The subscribing station 22 also includes a user interface 30, which may include components such as, for example, one or more user input devices (e.g., microphone, keypad, or the like), one or more speakers, a display, or the like.

FIG. 10 is a block diagram of an exemplary embodiment of the base station 14-1. This discussion is equally applicable to the other base stations 14-2 and 14-3. In general, the base station 14-1 includes a control system 32 having associated memory 34. In addition, in this embodiment, the base station 14-1 includes sector transmitters 36-1, 36-2, and 36-3 for the sectors 16-1, 16-2, and 16-3 (FIG. 1), respectively. Note that the sector transmitters 36-1, 36-2, and 36-3 may be part of sector transceivers for the corresponding sectors 16-1, 16-2, and 16-3. Alternatively, the base station 14-1 may include separate sector receivers for the sectors 16-1, 16-2, and 16-3. The functionality of the base station 14-1 discussed above for uplink power control may be implemented in hardware forming part of the control system 32, software stored in the memory 34, or a combination thereof.

Those skilled in the art will recognize improvements and modifications to the preferred embodiments of the present invention. All such improvements and modifications are considered within the scope of the concepts disclosed herein and the claims that follow.

What is claimed is:

1. A method of operating a subscribing station located within a serving sector of a cell within a wireless network, comprising:
    obtaining at least one interference parameter for each of one or more neighboring sectors of the serving sector by obtaining an interference parameter that is an interference threshold for each of the one or more neighboring sectors; and
    controlling a maximum transmit power of the subscribing station based on the at least one interference parameter for each of the one or more neighboring sectors by:
        controlling the maximum transmit power of the subscribing station based on the interference parameter for each of the one or more neighboring sectors;
        determining an estimated received power to the neighboring sector for each neighboring sector of the one or more neighboring sectors;
        determining whether the interference threshold is greater than the estimated received power for the neighboring sector for each neighboring sector of the one or more neighboring sectors;
        if the interference threshold for at least one neighboring sector of the one or more neighboring sectors is not greater than the estimated received power for the at least one neighboring sector, decreasing the maximum transmit power as compared to a standard maximum transmit power;
        determining a power headroom of the subscribing station based on the maximum transmit power as controlled based on the interference parameter for each of the one or more neighboring sectors; and
        reporting the power headroom of the subscribing station to a base station for the cell in which the subscribing station is located, wherein the base station allocates resources to the subscribing station based on the power headroom.

2. The method of claim 1 wherein the interference threshold for only one neighboring sector of the one or more neighboring sectors is not greater than the estimated received power for the one neighboring sector, and decreasing the maximum transmit power as compared to the standard maximum transmit power comprises:
    determining a difference value between the estimated received power for the one neighboring sector and the interference threshold for the one neighboring sector; and
    subtracting the difference value from the standard maximum transmit power to provide the maximum transmit power of the subscribing station.

3. The method of claim 1 wherein the interference threshold is not greater than the estimated received power for two or more neighboring sectors of the one or more neighboring sectors, and decreasing the maximum transmit power as compared to the standard maximum transmit power comprises:
    determining a difference value between the estimated received power and the interference threshold for each of the two or more neighboring sectors;
    identifying a maximum difference value from the difference values for the two or more neighboring sectors; and subtracting the maximum difference value from the standard maximum transmit power to provide the maximum transmit power of the subscribing station.

4. The method of claim 1 wherein controlling the maximum transmit power of the subscribing station further comprises providing the standard maximum transmit power as the maximum transmit power of the subscribing station if, for each of the one or more neighboring sectors, the interference threshold is greater than the estimated received power.

5. The method of claim 1 wherein the one or more neighboring sectors are one of a group consisting of: all inter-cell neighboring sectors of the serving sector, a subset of all inter-cell neighboring sectors of the serving sector, all inter-cell and intra-cell neighboring sectors of the serving sector, and a subset of all inter-cell and intra-cell neighboring sectors of the serving sector.

6. The method of claim 1 wherein the at least one interference parameter for each of the one or more neighboring sectors is adaptively controlled.

7. A method of operating a subscribing station located within a serving sector of a cell within a wireless network, comprising:
obtaining at least one interference parameter that is an interference threshold for each of one or more neighboring sectors of the serving sector wherein a bandwidth in the serving sector and the one or more neighboring sectors is divided into a plurality of frequency zones, and obtaining the at least one interference parameter for each of the one or more neighboring sectors comprises, for each frequency zone of the plurality of frequency zones, obtaining an interference parameter for the frequency zone from at least one neighboring sector of the one or more neighboring sectors;
controlling a maximum transmit power of the subscribing station based on the at least one interference parameter for each of the one or more neighboring sectors by determining an estimated received power to the neighboring sector for each neighboring sector of the one or more neighboring sectors and, for each frequency zone of the plurality of frequency zones:
controlling the maximum transmit power of the subscribing station for the frequency zone based on the interference parameter for the frequency zone from each of the at least one neighboring sectors for which an interference parameter for the frequency zone has been obtained;
for each neighboring sector of the at least one neighboring sector for which an interference threshold for the frequency zone has been obtained, determining whether the interference threshold for the neighboring sector for the frequency zone is greater than the estimated received power for the neighboring sector;
if the interference threshold for the frequency zone is not greater than the estimated received power for at least one of the at least one neighboring sector, decreasing the maximum transmit power for the frequency zone as compared to a standard maximum transmit power;
providing the standard maximum transmit power as the maximum transmit power of the subscribing station for the frequency zone if, for each of the at least one neighboring sector for which an interference threshold for the frequency zone has been obtained, the interference threshold is greater than the estimated received power.

8. The method of claim 7 wherein the interference threshold for the frequency zone is not greater than the estimated received power for only one neighboring sector of the at least one neighboring sector, and decreasing the maximum transmit power for the frequency zone as compared to the standard maximum transmit power comprises:
determining a difference value between the estimated received power for the one neighboring sector and the interference threshold for the frequency zone for the one neighboring sector; and
subtracting the difference value from the standard maximum transmit power to provide the maximum transmit power of the subscribing station for the frequency zone.

9. The method of claim 7 wherein the interference threshold for the frequency zone is not greater than the estimated received power for two or more neighboring sectors of the at least one neighboring sector, and decreasing the maximum transmit power for the frequency zone as compared to the standard maximum transmit power comprises:
determining a difference value between the estimated received power and the interference threshold for the frequency zone for each of the two or more neighboring sectors;
identifying a maximum difference value from the difference values for the two or more neighboring sectors; and
subtracting the maximum difference value from the standard maximum transmit power to provide the maximum transmit power of the subscribing station for the frequency zone.

10. The method of claim 7 wherein the maximum transmit power for at least one frequency zone of the plurality of frequency zones is different than the maximum power for at least one other frequency zone of the plurality of frequency zones.

11. The method of claim 7 further comprising:
for each frequency zone of the plurality of frequency zones, determining a power headroom of the subscribing station for the frequency zone based on the maximum transmit power of the subscribing station for the frequency zone; and
reporting the power headroom of the subscribing station for each of the plurality of frequency zones to a base station for the cell in which the subscribing station is located, wherein the base station selects a frequency zone for the subscribing station based on the power headroom of the subscribing station for each of the plurality of frequency zones to provide a selected frequency zone and allocates resources to the subscribing station based on the power headroom of the subscribing station for the selected frequency zone.

12. A method of operating a subscribing station located within a serving sector of a cell within a wireless network, comprising:
obtaining at least one interference parameter for each of one or more neighboring sectors of the serving sector by obtaining an interference parameter for the frequency zone from at least one neighboring sector of the one or more neighboring sectors, wherein:
a bandwidth in the serving sector and the one or more neighboring sectors is divided into a plurality of frequency zones;
for each sector, one frequency zone of the plurality of frequency zones is an unrestricted frequency zone and other frequency zones of the plurality of frequency zones are restricted frequency zones; and
each sector of the serving sector and the one or more neighboring sectors uses a different frequency zone of the plurality of frequency zones as the unrestricted frequency zone of the sector;

controlling a maximum transmit power of the subscribing station based on the at least one interference parameter for each of the one or more neighboring sectors by:
providing a standard maximum transmit power as the maximum transmit power for the subscribing station for the unrestricted frequency zone of the serving sector; and
for each restricted frequency zone of the serving sector, controlling the maximum transmit power of the subscribing station for the restricted frequency zone based on the interference parameter for the restricted frequency zone from each of the at least one neighboring sector for which an interference parameter for the restricted frequency zone has been obtained.

13. The method of claim 12 wherein the interference parameter for each of the one or more neighboring sectors is an interference threshold, and for each restricted frequency zone of the serving sector, controlling the maximum transmit power of the subscribing station for the restricted frequency zone comprises:
for each neighboring sector of the one or more neighboring sectors, determining an estimated received power to the neighboring sector;
for each neighboring sector of the at least one neighboring sector for which an interference threshold for the restricted frequency zone has been obtained, determining whether the interference threshold for the neighboring sector for the restricted frequency zone is greater than the estimated received power for the neighboring sector; and
if the interference threshold for the restricted frequency zone is not greater than the estimated received power for at least one of the at least one neighboring sector, decreasing the maximum transmit power for the restricted frequency zone as compared to the standard maximum transmit power.

14. The method of claim 13 wherein the interference threshold for the restricted frequency zone is not greater than the estimated received power for two or more neighboring sectors of the at least one neighboring sector, and decreasing the maximum transmit power for the restricted frequency zone as compared to the standard maximum transmit power comprises:
determining a difference value between the estimated received power and the interference threshold for the restricted frequency zone for each of the two or more neighboring sectors;
identifying a maximum difference value from the difference values for the two or more neighboring sectors; and
subtracting the maximum difference value from the standard maximum transmit power to provide the maximum transmit power of the subscribing station for the restricted frequency zone.

15. The method of claim 13 wherein controlling the maximum transmit power of the subscribing station for the restricted frequency zone further comprises providing the standard maximum transmit power as the maximum transmit power of the subscribing station for the restricted frequency zone if, for each of the at least one neighboring sector for which an interference threshold for the restricted frequency zone has been obtained, the interference threshold is greater than the estimated received power.

16. The method of claim 13 wherein the interference threshold for the restricted frequency zone is not greater than the estimated received power for only one neighboring sector of the at least one neighboring sector, and decreasing the maximum transmit power for the restricted frequency zone as compared to the standard maximum transmit power comprises:
determining a difference value between the estimated received power for the one neighboring sector and the interference threshold for the restricted frequency zone for the one neighboring sector; and
subtracting the difference value from the standard maximum transmit power to provide the maximum transmit power of the subscribing station for the restricted frequency zone.

17. The method of claim 12 wherein the maximum transmit power for the serving sector for at least one frequency zone of the plurality of frequency zones is different than the maximum transmit power for the serving sector for at least one other frequency zone of the plurality of frequency zones.

18. The method of claim 12 further comprising:
for each frequency zone of the plurality of frequency zones, determining a power headroom of the subscribing station for the frequency zone based on the maximum transmit power of the subscribing station for the frequency zone; and
reporting the power headroom of the subscribing station for each of the plurality of frequency zones to a base station for the cell in which the subscribing station is located, wherein the base station selects a frequency zone for the subscribing station based on the power headroom of the subscribing station for each of the plurality of frequency zones to provide a selected frequency zone and allocates resources to the subscribing station based on the power headroom of the subscribing station for the selected frequency zone.

19. The method of claim 18 wherein in order to select the frequency zone for the subscribing station, the base station determines whether the subscribing station is a cell edge subscribing station based on the power headroom of the subscribing station for each of the plurality of frequency zones and selects the unrestricted frequency zone for the subscribing station if the subscribing station is determined to be a cell edge subscribing station.

20. A subscribing station adapted to be used within a serving sector of a cell within a wireless network, comprising:
a wireless communication interface adapted to communicatively couple the subscribing station to the wireless network; and
a control system associated with the wireless communication interface and adapted to:
obtain at least one interference parameter for each of one or more neighboring sectors of the serving sector by obtaining an interference parameter that is an interference threshold for each of the one or more neighboring sectors; and
control a maximum transmit power of the subscribing station based on the at least one interference parameter for each of the one or more neighboring sectors by:
controlling the maximum transmit power of the subscribing station based on the interference parameter for each of the one or more neighboring sectors;
determining an estimated received power to the neighboring sector for each neighboring sector of the one or more neighboring sectors;
determining whether the interference threshold is greater than the estimated received power for the neighboring sector for each neighboring sector of the one or more neighboring sectors;

if the interference threshold for at least one neighboring sector of the one or more neighboring sectors is not greater than the estimated received power for the at least one neighboring sector, decreasing the maximum transmit power as compared to a standard maximum transmit power; and determining a power headroom of the subscribing station based on the maximum transmit power as controlled based on the interference parameter for each of the one or more neighboring sectors; and reporting the power headroom of the subscribing station to a base station for the cell in which the subscribing station is located, wherein the base station allocates resources to the subscribing station based on the power headroom.

\* \* \* \* \*